United States Patent
Knutson et al.

(10) Patent No.: US 6,788,710 B1
(45) Date of Patent: Sep. 7, 2004

(54) AUXILIARY DATA INSERTION IN A TRANSPORT DATASTREAM

(75) Inventors: Paul Gothard Knutson, Indianapolis, IN (US); Billy Wesley Beyers, Jr., Greenfield, IN (US); Kumar Ramaswamy, Indianapolis, IN (US); Thomas Anthony Stahl, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/187,318

(22) Filed: Nov. 6, 1998

Related U.S. Application Data

(60) Provisional application No. 60/096,226, filed on Aug. 12, 1998, and provisional application No. 60/078,643, filed on Mar. 19, 1998.

(51) Int. Cl.$^7$ .................................................. H04S 3/04
(52) U.S. Cl. ..................... 370/535; 370/536; 370/537; 370/538
(58) Field of Search ................................ 370/535, 536, 370/537, 538, 539, 540, 541, 542, 394, 493, 505, 506, 522, 528; 386/95, 96, 98, 99, 102, 104, 109, 112, 124

(56) References Cited

U.S. PATENT DOCUMENTS

| | | | |
|---|---|---|---|
| 5,548,532 A | * | 8/1996 | Menand et al. ............. 370/477 |
| 5,563,884 A | * | 10/1996 | Fimoff et al. ............... 370/391 |
| 5,565,923 A | * | 10/1996 | Zdepski ............... 375/240.226 |
| 5,596,581 A | * | 1/1997 | Saeijs et al. ................. 370/394 |
| 5,619,269 A | * | 4/1997 | Lee et al. ............... 375/240.01 |
| 5,619,337 A | | 4/1997 | Naimpally .................... 386/83 |
| 5,691,986 A | | 11/1997 | Pearlstein .................... 370/477 |
| 5,966,120 A | * | 10/1999 | Arazi et al. .................. 370/505 |
| 5,987,212 A | * | 11/1999 | Kim et al. ..................... 386/68 |
| 6,041,161 A | * | 3/2000 | Okamoto et al. ........... 386/112 |
| 6,081,650 A | * | 6/2000 | Lyons et al. .................. 386/95 |
| 6,115,537 A | * | 9/2000 | Yamada et al. ............. 386/109 |

FOREIGN PATENT DOCUMENTS

| | | | | |
|---|---|---|---|---|
| EP | 680 216 A2 | 11/1995 | ............ | H04N/7/24 |
| EP | 723 376 A2 | 7/1996 | ............ | H04N/7/52 |
| EP | 0671106 B1 | 7/2000 | .......... | H04N/7/087 |

OTHER PUBLICATIONS

Robert Hopkins, *Digital Terrestrial HDTV for North America: The Grand Alliance HDTV System*, IEEE Transactions on Consumer Electronics, vol. 40, No. 3, Aug. 1994, pp. 185–198.

Moonky Lee et al., "Revised Record/Playback Interface Systems for GA–HDTV, HD–VCR and D3 VTR", IEEE Transactions on Consumer Electronics, vol. 42, No. 1, Feb. 1996, pp. 128–131.

Shoji Kitaori et al., "Channel Scheme for 3/4 in HDTV Digital VCR", Signal Processing: *Image communications 5* (1993) Elsevier Science Publishers B.V., SSDI 0923–5965 (93) E0031–X, pp. 425–430.

\* cited by examiner

*Primary Examiner*—Phirin Sam
(74) *Attorney, Agent, or Firm*—Joseph S. Tripolis; Joseph J. Laks; Ronald H. Kurdyis

(57) ABSTRACT

A digital device, such as a digital VTR, receives and records an MPEG compatible datastream. On play back, the DVTR inserts packetized auxiliary information, such as on-screen display information, into the transport datastream for transmission to another digital device, such as a television receiver. Time stamps in the MPEG compatible datastream are unaffected by the insertion of the auxiliary information. The DVTR VSB modulates the datastream to provide sufficient bandwidth for the auxiliary information in the datastream.

22 Claims, 5 Drawing Sheets

AUXILIARY DATA INSERTION IN A TRANSPORT DATASTREAM

This original application claims priority to U.S. provisional application 60/078,643, filed on Mar. 19, 1998, in the name of Knutson et al., and to U.S. provisional application 60/096,226, filed on Aug. 12, 1998, also in the name of Knutson et al.

FIELD OF THE INVENTION

This invention relates to a method for processing a digital video tape recorder datastream. Specifically, the invention relates to inserting auxiliary data into the reproduced digital datastream.

BACKGROUND OF THE INVENTION

High definition television (HDTV) signals typically are not compatible with current broadcast standards such as NTSC. A preferred signal coding standard suitable for use with the HDTV compatible signals is MPEG-2 (Motion Picture Experts Group, "Information Technology—Coding of Moving Pictures and Associated Audio Information: Video," ISO/IEC 13818-2, May 15, 1996) as adopted by the Grand Alliance for use in the United States. This well-known standard provides formatting guidelines for coding and compressing video, audio and auxiliary data. Digital MPEG-2 compatible television signals may be terrestrially broadcasted, transmitted via a satellite link or sent via a cable system. Regardless of the transmission mode, an associated transport data stream will likely be completely occupied with data of one type or another.

When a signal reaches the consumer, current analog television/NVTR configurations allow the consumer to record one program on a video tape recorder (VTR) and watch another program simultaneously. It is also possible for a viewer to set the VTR to record a received program without the television receiver operating. In either situation, the viewer may play back the recorded program at a later time.

Video tape recorders typically insert data and messages into the playback video stream to indicate to the viewer the status of the VTR. On screen display (OSD) messages, for example, a PLAY or FF (fast forward) message, or an entire bit-mapped display, are displayed within the viewing image of the television screen with the video. The messages indicate that the viewer has activated the associated control on the remote control unit or on the front panel of the VTR and that the VTR is responding accordingly.

In an analog VTR system, one method of inserting an OSD message into the video signal at playback is by switching the OSD signal, for example, a DC voltage level, into the video signal. The switch occurs at the correct line and line position for the desired amount of time for display. When the OSD is removed, the video signal is uninterrupted by the switch.

For an MPEG-2 compatible incoming digital datastream containing the desired program to be recorded, the datastream is expected to be modulated and broadcasted to the consumer. The digital VTR (DVTR) receives the modulated signal, demodulates it, tunes to a particular channel and records the recovered datastream/channel on tape. For many reasons, it is not desirable to decode the MPEG-2 compatible encoded datastream either before recording or in playback. These reasons include the added cost of including decoding and formatting hardware in the DVTR, and potentially losing all but the primarily desired program if the datastream contains multiple programs. Because of the precise timing required to transmit an MPEG-2 compatible datastream, inserting auxiliary data into the capacity-filled datastream by overwriting data in selected packets would require decoding and encoding hardware, and recalculating presentation and display time stamps for the transport datastream. This is not desirable because of the associated cost and because of the loss of data which may be visible to the viewer. However, digital television receivers typically include the ability to mix OSD information into the video signal prior to display. Because of this, and because not all auxiliary data is OSD data, it is preferable to insert auxiliary data into a digital data stream without affecting the existing transport datastream rather than try to mix appropriate data into the video signal.

Therefore simple and efficient means to insert auxiliary data, such as OSD data, into the MPEG-2 compatible datastream is desirable. The invention presented herein provides such means.

SUMMARY OF THE INVENTION

A digital device receives digital program data including time stamps and inserts auxiliary information for transmission on a transmission channel. Prior to transmission, the digital device modulates the program data and the auxiliary information without altering the time stamps.

DETAILED DESCRIPTION OF THE PREFERRED EMBODIMENTS

It is expected that digital VTR's (DVTR) will record an entire channel recovered from a transport datastream which has been demodulated to baseband. The transport datastream is compressed and is expected to be filled to capacity, which is nominally a data rate of 19.4 million bits per second. This data rate is for each channel which includes multiple levels of audio, video and auxiliary information as defined by the MPEG standard. According to the principles of the present invention, to play back the recording, the recorded datastream is again modulated (remodulated) and sent to the display demodulator in the television set via a coaxial cable. The remodulation provides adequate bandwidth thereby allowing the insertion of auxiliary information produced by the DVTR. The modulation technique used vestigial sideband (VSB) modulation based on VSB modulation as proposed for the Grand Alliance broadcast high definition television (HDTV) system in the United States. If the recorded signal is not at baseband, it will be necessary to bring the signal to baseband at the time of playback before implementing the embodiments described below.

Timing characteristics of the transmitted signal are important. Demodulation of the signal is often based on one or more VCXO's (voltage controlled crystal oscillator) which have limited tuning ranges. Since the entire contents of the recording fit in a modulated transmission channel, playback through the transmitter's encoder/modulator will result in a perfectly timed signal channel at the television's receiving demodulator/decoder. However, since the transmission channel is likely to be filled to capacity, auxiliary information, for example, OSD data, generally can not be multiplexed into the coded datastream without writing over part of the desired signal. Multiplexing of MPEG compatible data by known methods increases system complexity and cost because the encoded signal needs to be interpreted and at least partially decoded to determine where to add auxiliary data to the datastream without compromising the integrity of the datastream. The multiplexed data will require hardware to re-encode it or to identify it as data which is in a different format with respect to the play back data.

Figure 1:
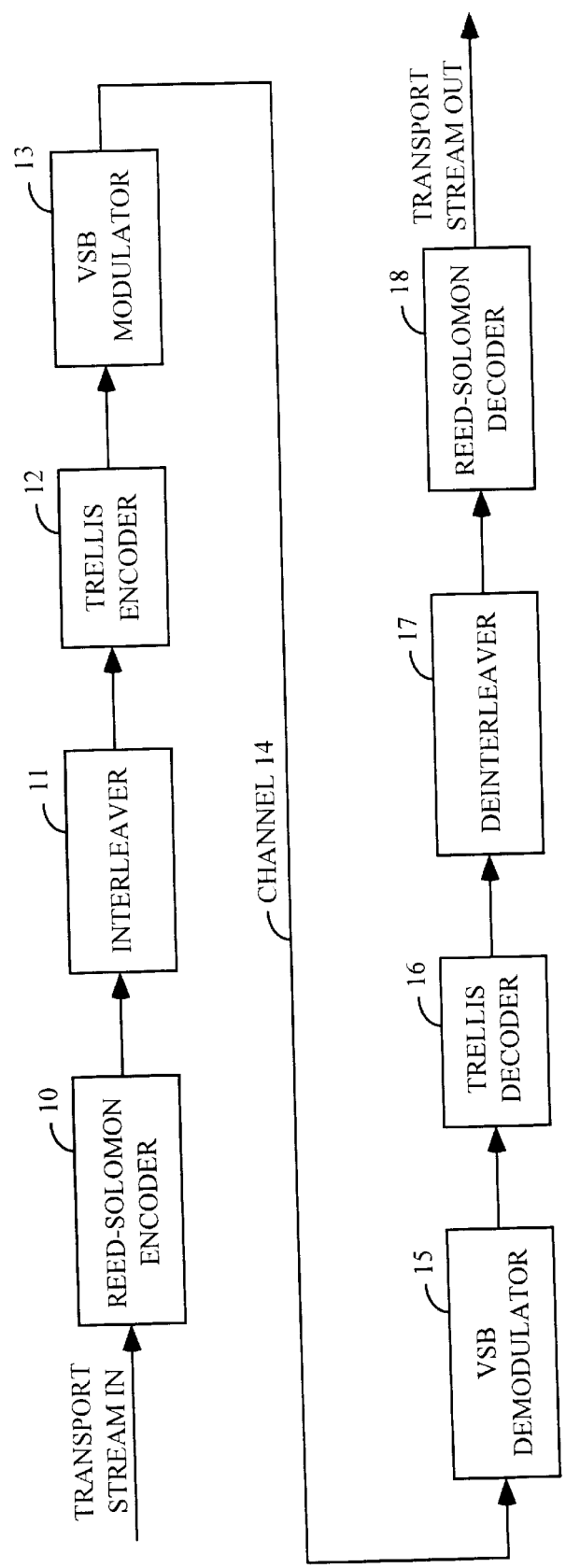
FIG. 1 illustrates a portion of an 8 VSB link as defined by the Advanced Television Standards Committee.

FIG. 1 illustrates a portion of a terrestrial 8 VSB link as defined by the Advanced Television Standards Committee (ATSC) in the United States. Reed/Solomon encoder 10 adds 20 parity bytes to each packet. Packets are 188 bytes each, including the MPEG sync byte. The sync byte is removed before Reed Solomon encoder 10 at the transmitter and reinserted after Reed Solomon decoder 18 at the receiver. The MPEG sync byte is not part of the transmission. Interleaver 11 scrambles the bytes to increase resistance to burst errors. Trellis encoder 12 receives the serialized bytes from Interleaver 11, and produces 3-bit symbols for every 2 input bits. VSB modulator 13 provides 8 VSB modulation and outputs nominally 10.76 million symbols per second.

The 8 VSB modulated signal is transmitted via channel 14 and received by VSB demodulator 15, which resides, for example, in a television receiver. Trellis decoder 16 removes the added bits inserted by element 12, and deinterleaver 17 unscrambles the datastream. Finally, Reed-Solomon decoder 18 decodes the datastream to the state is was in prior to processing by element 10 in the transmitter. The recorded digital data stream is now ready to be received by the receiver's MPEG-2 compatible decoder.

Figure 2:
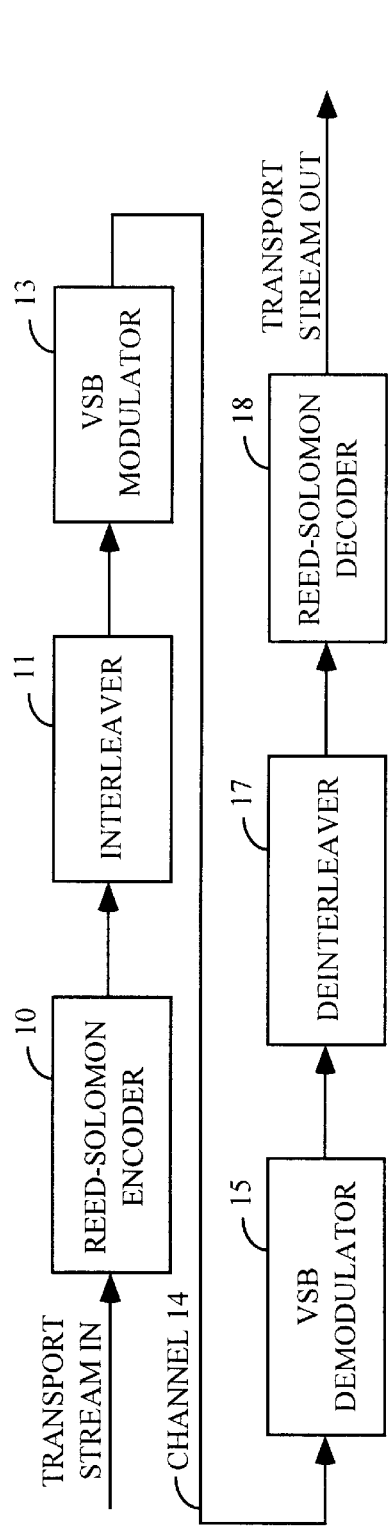
FIG. 2 illustrates preferred embodiments of the invention.

FIG. 2 illustrates a preferred embodiment of the invention. FIG. 2 includes most of the same elements shown in FIG. 1, as identified by the same reference numbers. Whereas the 8 VSB link described above encompasses the terrestrial broadcast channel, the configuration illustrated by FIG. 2 resides between the play back head of the DVTR and the MPEG decoder of the television receiver in this example.

The difference between FIGS. 1 and 2 is that trellis encoder 12 and trellis decoder 16 are deleted from the encoding/modulation chain and decoding/demodulation chain, respectively. By eliminating trellis encoder 12 and trellis decoder 16 in an 8 VSB system, one out of every three bits in the datastream becomes available for other usage, for example, auxiliary information. To maintain data integrity and proper timing, the freed space must be filled with auxiliary information or null data. In the case of the MPEG-2 compatible datastream, the added information and null data are packetized in a format compatible with the MPEG-2 standard.

Removing the trellis encoder/decoder from the encoder/modulation to decoder/demodulation processing reduces error correction capability. However, channel 14 preferably is an RF coaxial cable between the DVTR and the television receiver. Channel 14 is a very benign environment in which to transmit a datastream, because it is constituted by a short length of shielded cable in a controlled environment subject to little or no interference. Channel 14 has a good signal-to-noise ratio, virtually no ghosts and minimal radio frequency interference. The shorter the length of cable associated with channel 14, the better these characteristics are. However, even for substantially long runs, for example, across a house, an office building or an office complex, error correction is generally not needed for this configuration.

Figure 3A:
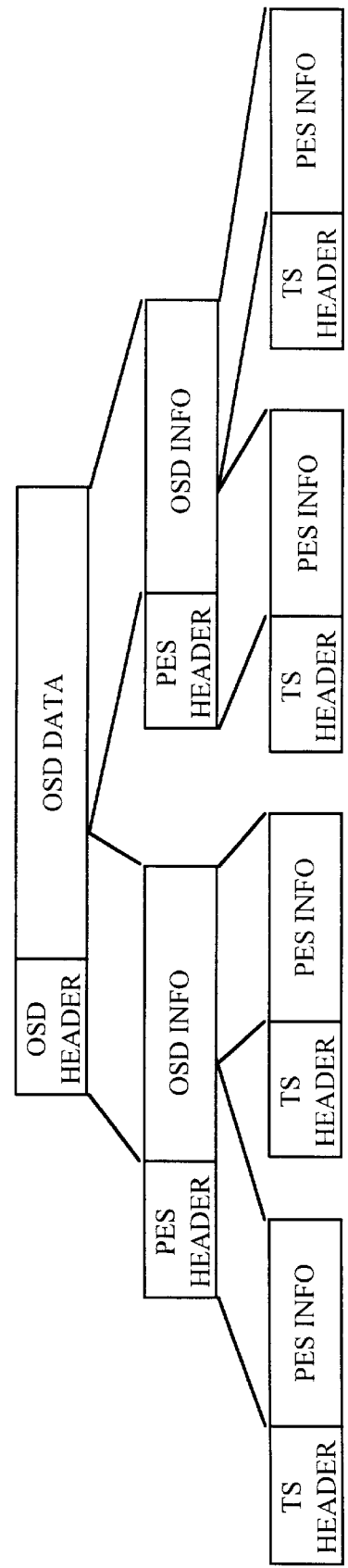
FIG. 3A illustrate the placement of auxiliary data into transport stream packets.
Figure 3:
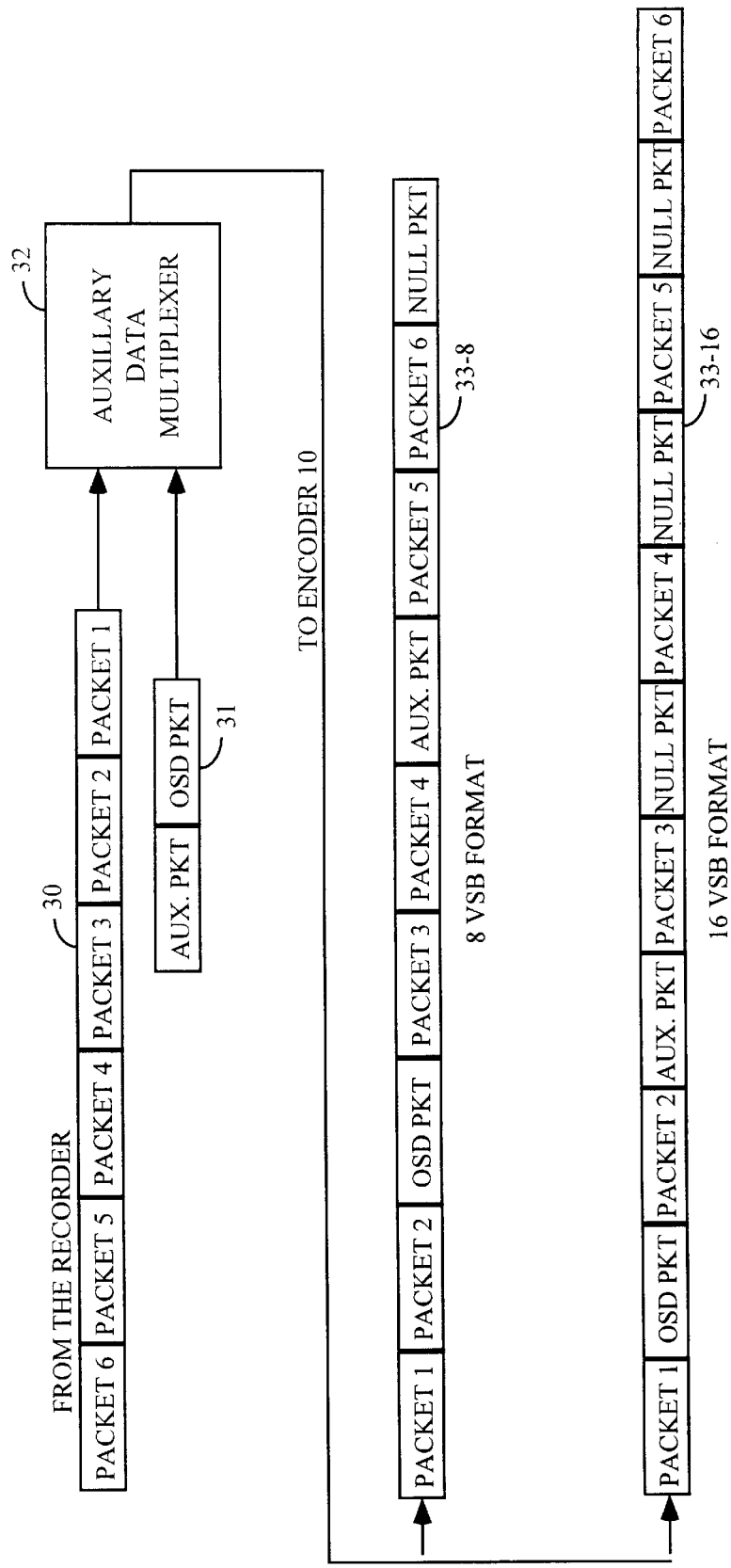
FIG. 3 illustrates a played back datastream according to the principles of the present invention.

FIG. 3 illustrates an MPEG-2 compatible packetized datastream and packets of auxiliary information, for example, OSD data, for an 8 VSB system. Datastream 30 represents the recorded datastream being played back from the DVTR. Datastream 31 represents an auxiliary datastream to be inserted into datastream 30. Both datastreams 30 and 31 are packetized. Datastream 30 was recorded and reproduced in a packetized manner and is substantially unchanged at this point in the DVTR data processing except for the time delay until viewer playback. Auxiliary data multiplexer 32 receives datastreams 31 and 32 and outputs datastream 33 to Reed-Solomon encoder 10 of FIG. 1. The OSD packets and/or auxiliary data packets may be generated by a microprocessor in the DVTR.

As is seen in FIG. 3, datastream 33-8 includes one auxiliary packet, containing OSD information, for example, for every two recorded packets. When no auxiliary data is present for insertion into datastream 30 being played back from the DVTR, null packets are inserted into datastream 33 to maintain timing in the transmission channel.

FIG. 3A illustrates how auxiliary data is formed and finally placed into the transport stream packets. In this example, the auxiliary data is OSD information. The OSD information is generated by the DVTR and annotated with a header. The header and OSD information are placed in program elemental stream (PES) packets. If the header and OSD information are longer than one PES packet, the header and information are placed in multiple PES packets. The PES packets are then split into transport stream packets and placed in the transport datastream. If a packet is not completely filled with information, it is padded to maintain timing.

Figure 4:
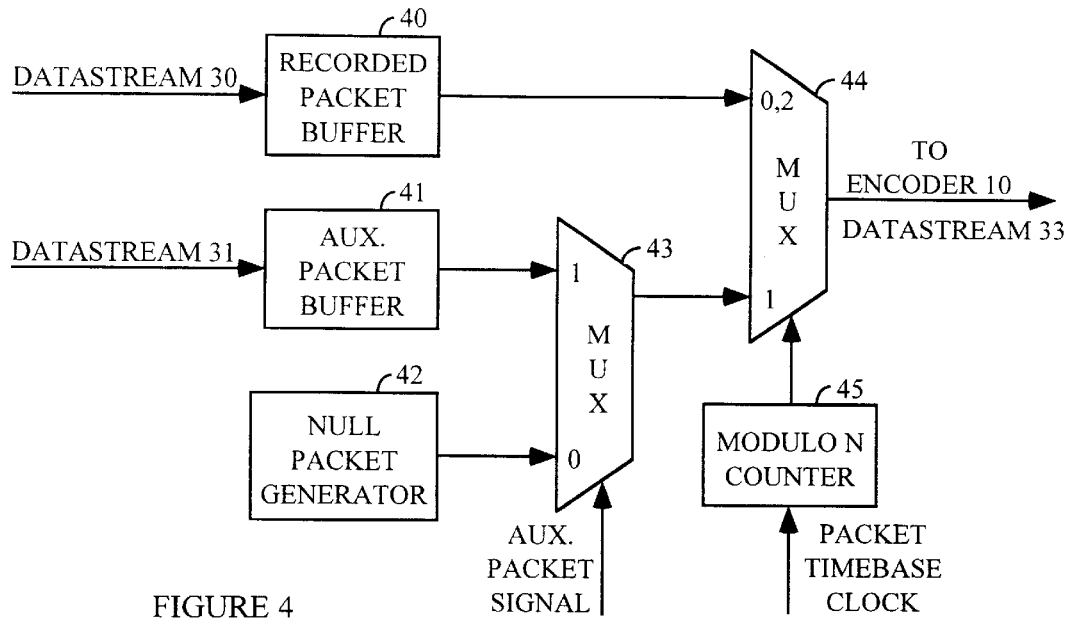
FIG. 4 illustrates apparatus for inserting auxiliary packets into a played back datastream.

FIG. 4 illustrates one possible embodiment of auxiliary data multiplexer 32. Datastream 30 is received by recorded packet buffer 40, which is sufficiently large to maintain the flow of packets while an auxiliary or null packet is inserted after every two recorded packets. Datastream 31 is generated by a microprocessor in the DVTR, and comprises packets including auxiliary data to transmit with the played back data. Auxiliary packet buffer 41 receives datastream 31 and buffers the auxiliary packet until the proper time for insertion into output datastream 33. Null generator 42 outputs a null packet when there is no auxiliary packet for insertion. Auxiliary packet buffer 41 and null generator 42 both supply multiplexer 43 with their respective output packets. Multiplexer 43 receives an auxiliary packet valid signal whenever an auxiliary packet is available in auxiliary packet buffer 41. Every third packet, multiplexer 43 outputs either an auxiliary packet or a null packet to multiplexer 44 depending on the state of the auxiliary packet valid signal.

Multiplexer 44 receives two recorded packets from recorded packet buffer 40 for every one packet received for multiplexer 43. Modulo counter 45 controls the insertion of the auxiliary or null packets into the recorded data stream by multiplexer 44 via a packet time base clock. When the packet time base clock is 0 or 2, as shown in FIG. 4, for example, a packet from datastream 30 is inserted into output datastream 33. When the packet time base clock is 1, the auxiliary or null packet is inserted into output datastream 33. Output datastream 33 is then input to Reed-Solomon encoder 10 of FIG. 1.

Figure 5:
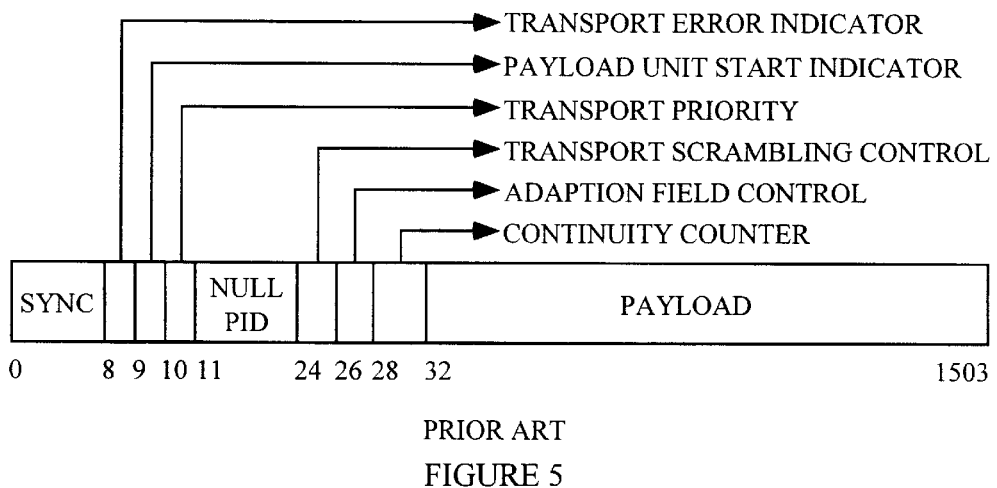
FIG. 5 illustrates a packet according to the MPEG-2 standard.

FIG. 5 shows a null packet as defined in section 2.4.3 of the MPEG-2 standard. It is shown here to clearly illustrate the difference between it and the modified null packet format shown in FIG. 6. The modified null packet is used for auxiliary data and null data insertion into the played back datastream.

The insertion of modified null packets into the datastream is a transport level function. The physical layer is multiplexed at the transport level to fill the additional bandwidth created by remodulation with the modified null packets. The modified null packet, containing either auxiliary data or null data, may be interpreted as an ordinary null packet by normal MPEG transport demultiplexers. However, a modified transport demultiplexer can identify and parse the null packets containing useful information as will be discussed.

Figure 6:
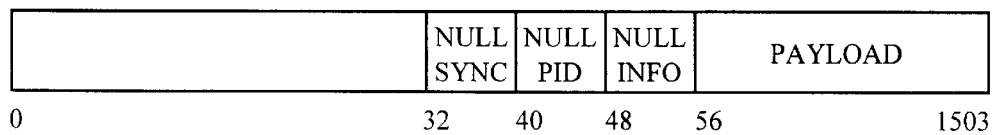
FIG. 6 illustrates one embodiment of a modified packet according to the principles of the present invention.

FIG. 6 illustrates one possible null packet format produced by null packet generator 42 of FIG. 4. Both packets (FIGS. 5 and 6) are 1504 bits long, and the first 32 bits of each packet are defined by the MPEG-2 standard. The packet of FIG. 6 differs in that bits 32 through 55 include information other than payload data. Bits 32 to 39 provide a null transport packet synchronization data. Bits 40 to 47 provide the null transport packet identification (PID). Bits 48 through 55 provide other null packet transport information, for example, CRC (cyclic redundancy check) data. Payload data (auxiliary data or null data) begins at bit 56. However, additional information bits beginning at bit 48 may be more than or fewer than just described depending on the information to be transmitted with the payload data.

Figure 7:
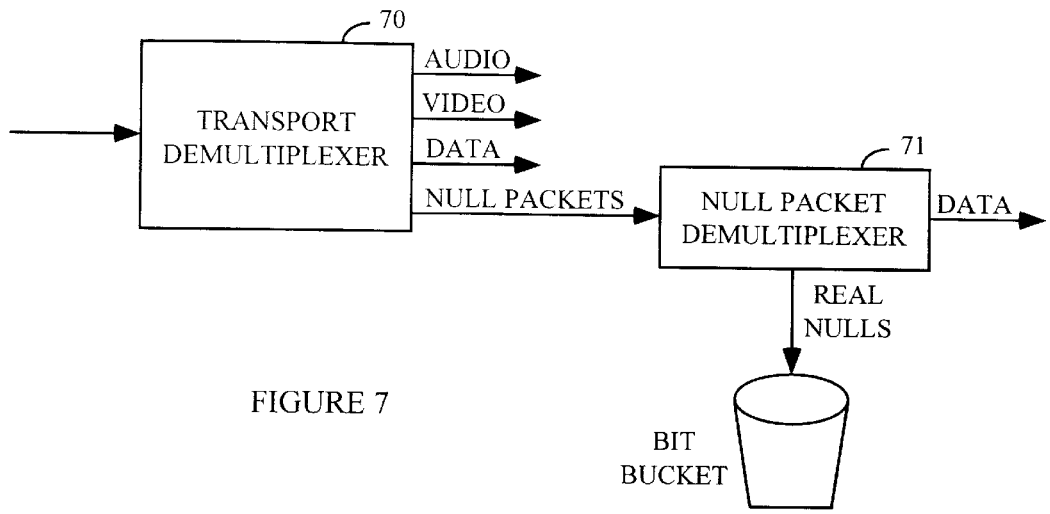
FIG. 7 illustrates an embodiment of a device for removing auxiliary packets from the played back datastream.

FIG. 7 illustrates an exemplary transport datastream demultiplexer resident in the device receiving the transport stream, for example, a television receiver or a personal computer equipped with an MPEG-2 compatible decoder. The transport datastream demultiplexer is located down stream from elements 14, 15 and 16 of FIG. 2.

The modulated datastream is received by a digital device, such as a digital television, and VSB demodulated, as shown in FIGS. 1 and 2, to reproduce the packetized datastream. Packetized data is input into multiplexer 70. A data type selection signal identifies the type of packet received by multiplexer 70. For example, the packet may contain audio data, video data or auxiliary data inserted into datastream 30 of FIG. 3 prior to datastream 30 being recorded, or a packet containing either null data or auxiliary data inserted by the recorder. Recorded packets are output to proper processing channels depending upon the type of packet. DTVR inserted packets are output from demultiplexer 70 and input to demultiplexer 71. Demultiplexer 71 identifies whether the inserted packet contains auxiliary data or null data. If the packet contains null data, the data is discarded. If the packet contains auxiliary data, such as OSD data, it is output from demultiplexer 71 to an auxiliary processor, for example, an OSD data processor. An alternative to the hardware implementation of the transport datastream demultiplexer is a software implementation which identifies the packets containing auxiliary or null data, and processes and/or routes the data accordingly.

Another embodiment of the invention is illustrated by the above drawings as well. FIG. 2 also illustrates a portion of a 16 VSB broadcast link as defined by the Advanced Television Standards Committee (ATSC). One difference between 8 VSB and 16 VSB is that trellis coding and trellis decoding are not used in a 16 VSB system. Another difference is that for 8 VSB one bit is added for every two original bits in the datastream by trellis encoder 12 of FIG. 1. For 16 VSB, 2 bits are added for every two original bits in the datastream during VSB modulation in element 13. The corresponding VSB demodulation occurs in VSB demodulator 15 of FIG. 2.

FIG. 3 illustrates output datastream 33-16 after 16 VSB modulation. Datastream 33-16 includes alternating packets of recorded play back data and DTVR inserted data. Packets 1 to 6 represent corresponding data packets input by datastream 30 to element 32. The inserted data represent OSD packets, other auxiliary data packets and null packets. The arrangement and frequency of each of these inserted packet types is exemplary. Actual occurrence will depend on the data to be inserted into datastream 33-16. Once received, the datastream is processed as described above in association with FIG. 7.

Figure 8:
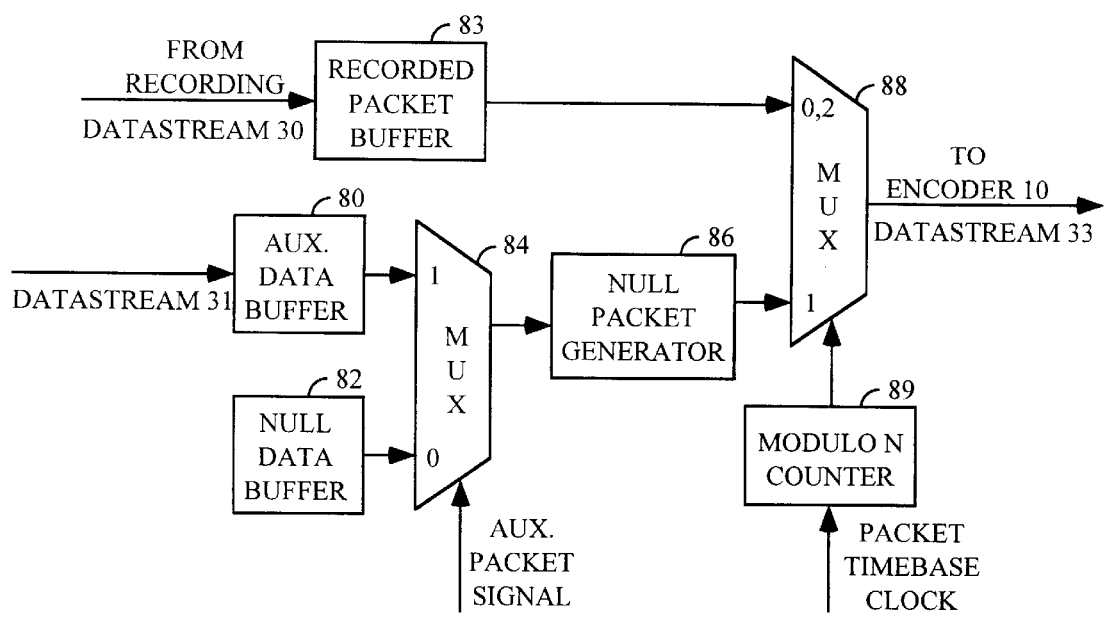
FIG. 8 illustrates an embodiment of a device for inserting auxiliary packets into the played back datastream.

An alternate to the embodiment of auxiliary data multiplexer 32 is shown in FIG. 8. This embodiment may be more efficient for 16 VSB modulation because of the higher rate of inserted data. The difference between FIG. 8 and FIG. 4 is in the multiplexing of the auxiliary and null data into multiplexer 84. In this embodiment, auxiliary data buffer 80 and null data buffer 82 provide data to multiplexer 84. Depending on the state of the auxiliary packet signal, one of these two data strings are output to null packet generator 86. Generator 86 receives the data stream selected and creates a packet. The packet is then provided to multiplexer 88 and inserted into datastream 33 as described above.

Auxiliary data buffer 80 receives all types of auxiliary data, including OSD data. If the auxiliary data is longer than one packet, then the next sequence of inserted auxiliary data packets will contain this information and no null packets will be generated. If the auxiliary data is shorter than one packet, or if the last packet of auxiliary data from a sequence is shorter than a packet, either buffer 82 will pad the remaining bits with null data, or packet generator 86 will do so. Recorded packet buffers 40 and 83, multiplexers 44 and 88, and modulo counters 45 and 89 of FIGS. 4 and 8, respectively, perform substantially identical functions.

The disclosed system according to the principles of the present invention exhibits operational advantages compared to conventional cable head-end processing. Specifically, the disclosed system inserts information into the transport datastream without having to modify time stamp information or the timing of time stamp information. In contrast, conventional cable head-end processing involves a more complex operation of multiplexing program datastreams from two (or more) separate sources (e.g., from two separate video tape devices) and combining time stamp information from the two datastreams in a manner which preserves timing integrity. The conventional cable head-end processing must also maintain consistent PID information for both datastreams. This requirement adds to the system complexity. Conventional processing insures that the separate programs can be identified in the transport stream. The disclosed system does not exhibit this complexity since the disclosed system does not disturb the transport stream (time stamp) timing.

For either the 8 VSB or 16 VSB embodiments described above, various methods may be used to facilitate identifying null and auxiliary packets. A first method entails defining a standard packet identifier (PID) specific to auxiliary information, or even specific to OSD or other information. The transport stream may then be modified without analyzing the transport stream except for PID's. The defined PID allows the DVTR to easily insert auxiliary information packets into the 8 or 16 VSB modulated datastream, and for the receiving system to easily identify the inserted auxiliary information.

Alternatively, since the transport datastream recorded by the DVTR already includes some null packets and other non-critical data packets, the defined PID could allow the insertion of auxiliary data by overwriting or replacing these packets during play back using 8 VSB modulation with trellis coding (8 VSB-t). The inserted packet could then include the OSD information, for example, and a duration during which the information will be displayed to the viewer. The duration information would allow the message to be transmitted once rather than being repeated for the desired duration. Potential problems with overwriting null packets already existing in the transport datastream include the uncertainty that one or more null packets will be available when needed to transmit auxiliary data from the DVTR, and that sufficient null packets will be available as well. However, it is expected that some transmission channels will contain sufficient null packets to facilitate auxiliary information insertion by a DVTR.

This alternative embodiment entails analyzing the transport datastream to determine which packets may be used to transmit auxiliary data from the DVTR. This requires the interpretation of program association tables (PAT) and of program map tables (PMT) in the datastream to identify unused PID's. If a PID and associated packet is used to transport DVTR data, the associated PAT and PMT must be updated to indicate this usage. This is a complex approach since associated hardware must be incorporated in the DVTR to interpret and modify the transport datastream. Also, if the auxiliary data is to be encoded, encoding hardware must be included in the DVTR as well.

Whereas it is desirable to transmit the duration of validity and the auxiliary information once, this is not always effective. For example, the receiving device may be turned off or not connected to the DVTR when the message is sent by the DVTR. If the receiving device is activated during the valid period of the auxiliary information, the information must be retransmitted for the receiving device to act upon it. The reason for this is that the RF transmission channel is a one way data transmission channel.

An alternative to transmitting the auxiliary information once with a duration of validity is to repetitively transmit the auxiliary information at a desired frequency for the duration of validity. For example, if an OSD message is to be displayed for five seconds, the auxiliary information transmits the OSD message once a second for five seconds. The duration information may be updated and transmitted with the auxiliary information, or it may be eliminated altogether.

The inserted data discussed above has been described as auxiliary data. However, other types of information, such as commands to which downstream hardware may respond could also be inserted. The inserted data may be an entire bit-mapped image to fully or partially replace active video for a desired time, as well as updates to the bit-mapped image. The inserted data discussed above includes the ability to insert data into the play back datastream, where the data may represent any type of data to be sent by the DVTR.

A system in accordance with the principles of the present invention can be implemented by using any of three modulation formats with any of three data insertion methods, i.e., nine variations. Specifically, the system can operate with three standard modes of modulation including 8-VSB-t with trellis code (>19 Mb/s), 8-VSB without trellis code (>29 Mb/s), and 16-VSB (>38 Mb/s). These modulation formats are not exclusive of other formats. The system can operate with any of the following three data insertion methods:

Null Transport, where data is conveyed in null packets using a new protocol;

Auxiliary Data PID, where a pre-defined specific PID at the MPEG transport layer is used for Auxiliary data packets; and a method involving finding a PID not used in the current stream to use for auxiliary data, and modifying the PAT and PMT to identify the auxiliary data PID. These data insertion methods are not exclusive of other methods.

Regarding the physical RF channel for the remodulated information, a television receiver may be designed to expect the remodulation signal to be on a predetermined channel (e.g., channel 3 or 4) when the receiver operates in a monitor mode. In the monitor mode the receiver ignores physical tuning information in a VSB tuning stream (e.g., instructions to "tune to channel 22"). The receiver may be placed in the monitor mode by means of a user operated remote control device, and in such mode the receiver looks for remodulation data on the predetermined remodulation channel.

One advantage of defining an inserted packet is increased efficiency in re-synchronizing the data stream when sync is lost. Because the packet is unique and may have a unique PID, it is readily identified by a receiving device. Once the null packet is identified, its header may be read. The header may include information such as the length of the data in the current packet and the location of the start of the next packet, either explicitly or by calculation from the current data pointer. This information, the identification of the inserted packet or a combination of the information and identification of the inserted packet, allows the receiving device to synchronize itself to the elemental datastream no later than the beginning of the next packet. Early and efficient synchronization greatly reduces error data caused by a loss or lack of synchronization by synchronizing the receiver to the datastream when the first inserted packet occurring after synchronization is lost appears.

The invention is not limited to inserting auxiliary information with a DVTR. Many other devices may benefit by implementing the principles discussed above. For example, set top boxes for satellites or cable systems, camcorders, digital video disk players and game machines also insert auxiliary data into a digital datastream or an MPEG formatted datastream of limited bandwidth. Because the embodiments discussed above are efficient and uncomplicated, they may be implemented in any device required to insert additional information in a digital datastream.

Likewise, the receiving device need not be a digital television receiver. It may be, for example, another DVTR or another recording media, or a set top box. These devices may use the principles of the present invention to receive and use the information intended for it, and then discard or pass the datastream on to another device. These devices may also interpret the auxiliary information and add their own auxiliary information as required according to the principles of the present invention. This may entail demodulating the VSB modulated signal, parsing and/or inserting additional auxiliary information and modulating the signal again for transmission. Another alternative is to identify true null packets without demodulating the signal and inserting the desired auxiliary information in place of these null packets.

The principles of the present invention may also be implemented over other channel formats. For example, an IEEE 1394 isochronous transmission channel may benefit from the invention as well. The mechanisms discussed above could be implemented by requesting a channel with a larger bandwidth than that of the recorded datastream. For example, if it is desired to transfer a 19.1 Mbps MPEG-2 compatible signal, the transmitting device (a DVTR, DVD player, etc.) would request a 38.2 Mbps channel and implement the 16 VSB modulation described above. In some cases, this has the added advantage of not requiring that unused channel bandwidth be filled with null packets. This would further simplify the receiving demultiplexer because it would not have to distinguish between added packets filled with information and added null packets inserted to fill the bandwidth. This implementation is attractive when the connected devices already have an existing IEEE 1394 interface.

Whereas this specification addresses MPEG-2 compatible data received and recorded by a DVTR, the embodiments discussed above will also work with other MPEG formats, for example, MPEG-1, or similar compressed and packetized digital datastreams.

What is claimed is:

1. A method for producing a digital datastream containing program information and auxiliary information for transmission via a transmission channel, said method comprising the steps of:
   providing a program datastream as successive transport packets with associated time stamps, the datastream being substantially capacity-filled;
   generating said auxiliary information as transport packets;
   inserting said auxiliary information transport packets into said capacity-filled program transport packet datastream to provide an output datastream as successive transport packets;
   modulating said output datastream to provide a modulated datastream; and
   conveying said modulated datastream to said transmission channel; wherein said inserting step provides said output datastream without altering said time stamps.

2. The method of claim 1, wherein:
   said auxiliary information is one of (a) information usable by a receiving digital device, and (b) null information.

3. The method of claim 1, wherein:
   said output datastream is an MPEG compatible datastream.

4. The method of claim 1, wherein:
   said providing step provides said program datastream from a storage medium.

5. The method of claim 1, wherein
   said transmission channel is an RF coaxial cable.

6. A method for producing a digital datastream containing program information and auxiliary information for transmission via a transmission channel, said method comprising the steps of:
   providing a program datastream as successive transport packets with associated time stamps, the datastream being substantially capacity-filled;
   generating said auxiliary information as transport packets;
   inserting said auxiliary information transport packets into said capacity-filled program transport packet datastream to provide an output datastream as successive transport packets;
   modulating said output datastream to provide a modulated datastream; and
   conveying said modulated datastream to said transmission channel;
   wherein said inserting step provides said output datastream without altering said time stamps, wherein
   said modulating step performs one of (a) 16 VSB modulation, (b) 8 VSB modulation without trellis coding and (c) 8 VSB modulation.

7. A method for producing a digital datastream containing program information and auxiliary information for transmission via a transmission channel, said method comprising the steps of:
   providing a program datastream as successive transport packets with associated time stamps, the datastream being substantially capacity-filled;
   generating said auxiliary information as transport packets;
   inserting said auxiliary information as transport packets into said capacity-filled program transport packet datastream to provide an output datastream as successive transport packets;
   modulating said output datastream to provide a modulated datastream; and
   conveying said modulated datastream to said transmission channel; wherein
   said inserting step provides said output datastream without altering said time stamps; and
   wherein said inserting step further comprises the steps:
   identifying null data in said program datastream; and
   replacing said null data with said auxiliary information.

8. A method for producing a digital datastream containing program information and auxiliary information for transmission via a transmission channel, said method comprising the steps of:
   providing a program datastream as successive transport packets with associated time stamps, the datastream being substantially capacity-filled;
   generating said auxiliary information as transport packets;
   inserting said auxiliary information transport packets into said capacity-filled program transport packet datastream to provide an output datastream as successive transport packets;
   modulating said output datastream to provide a modulated datastream; and
   conveying said modulated datastream to said transmission channel;
   wherein said inserting step provides said output datastream without altering said time stamps, wherein
   said auxiliary information is on-screen-display (OSD) data.

9. A digital device for producing a digital datastream containing program information and auxiliary information for transmission via a transmission channel, said digital device comprising:
   means for providing a program datastream as successive transport packets with associated time stamps, the datastream being substantially capacity-filled;
   means for generating said auxiliary information as transport packets;
   a multiplexer for multiplexing said auxiliary information transport packets and said capacity-filled program transport packet datastream to produce an output datastream as successive transport packets;
   a modulator for modulating said output datastream to produce a modulated datastream; and
   an output for conveying said modulated datastream to said transmission channel; wherein said multiplexer produces said output datastream without altering said time stamps.

10. The device of claim 9, wherein
said auxiliary information is one of (a) information usable by a receiving digital device, and (b) null information.

11. The device of claim 9, wherein:
said output datastream is an MPEG compatible datastream.

12. The device of claim 9, wherein:
said digital program datastream is retrieved from a storage medium.

13. The device of claim 9, wherein
said transmission channel is an RF coaxial cable.

14. A digital device for producing a digital datastream containing program information and auxiliary information for transmission via a transmission channel, said digital device comprising:
means for providing a program datastream as successive transport packets with associated time stamps, the datastream being substantially capacity-filled;
means for generating said auxiliary information as transport packets;
a multiplexer for multiplexing said auxiliary information transport packets and said capacity-filled program transport packet datastream to produce an output datastream as successive transport packets;
a modulator for modulating said output datastream to produce a modulated datastream; and
an output for conveying said modulated datastream to said transmission channel; wherein said multiplexer produces said output datastream without altering said time stamps, wherein
said modulator performs one of (a) 16 VSB modulation, (b) 8 VSB modulation without trellis encoding and (c) 8 VSB modulation.

15. A digital device for producing a digital datastream containing program information and auxiliary information for transmission via a transmission channel, said digital device comprising:
means for providing a program datastream as successive transport packets with associated time stamps, the datastream being substantially capacity-filled;
means for generating said auxiliary information as transport packets;
a multiplexer for multiplexing said auxiliary information transport packets and said capacity-filled program transport packet datastream to produce an output datastream as successive transport packets;
a modulator for modulating said output datastream to produce a modulated datastream; and
an output for conveying said modulated datastream to said transmission channel;
wherein said multiplexer produces said output datastream without altering said time stamps;
said digital device further comprising:
means to identify null data in said digital program datastream wherein said multiplexer replaces said null data with said auxiliary information.

16. A digital device for producing a digital datastream containing program information and auxiliary information for transmission via a transmission channel, said digital device comprising:
means for providing a program datastream as successive transport packets with associated time stamps, the datastream being substantially capacity-filled;
means for generating said auxiliary information as transport packets;
a multiplexer for multiplexing said auxiliary information transport packets and said capacity-filled program transport packet datastream to produce an output datastream as successive transport packets;
a modulator for modulating said output datastream to produce a modulated datastream; and
an output for conveying said modulated datastream to said transmission channel; wherein said multiplexer produces said output datastream without altering said time stamps, wherein
said auxiliary information is on-screen-display (OSD) data.

17. In a device for receiving a digital transport modulated datastream containing a substantially capacity-filled program information transport packet stream and auxiliary information transport packets via a transmission channel, apparatus for processing said datastream comprising:
an input for receiving said modulated datastream comprising;
a demodulator for demodulating said modulated datastream to provide a demodulated datastream;
a transport demultiplexer for separating said capacity-filled program information transport packet stream and said auxiliary information transport packets from said demodulated datastream;
a program processor for processing said separated program information packet stream;
means for identifying content of said separated auxiliary information packets as one of useable information and null information; and
an auxiliary information processor for processing said useable information.

18. The apparatus of claim 17, wherein:
said demodulator performs one of (a) 16 VSB demodulation, (b) 8 VSB demodulation without trellis encoding and (c) 8 VSB demodulation.

19. The apparatus of claim 17, wherein:
said identifying means is a demultiplexer.

20. The apparatus of claim 17, wherein:
said modulated datastream is an MPEG compatible datastream.

21. The apparatus of claim 17, wherein:
said auxiliary information is on-screen-display (OSD) data.

22. The apparatus of claim 17, wherein:
said transmission channel is an RF coaxial cable.

* * * * *